June 26, 1956     C. T. JOHNS     2,751,683
BABY SPOON
Filed Jan. 18, 1954

INVENTOR
CORYDON T. JOHNS
BY H. R. Johns
ATTORNEY

United States Patent Office 2,751,683
Patented June 26, 1956

2,751,683
BABY SPOON

Corydon T. Johns, Tampa, Fla.

Application January 18, 1954, Serial No. 404,452

2 Claims. (Cl. 30—324)

This invention relates to an infant's first spoon which begins to be used between about the ages of 1¼ and 2½ years. It has been observed that such a young child may grasp the handle of a spoon from both a side and an end. An object of this invention is to provide a spoon of the above sort which is better adapted to a child's needs than are existing baby spoons. Another object is to provide such a spoon that is shaped to be grasped with substantially equal facility by a tiny hand at the side or at the end.

A young child at the age when self feeding is started, lacks the finger dexterity that is later acquired. This is because the muscles in the first and second joints from the finger tips seem to be developed for use after the muscles in the palm of the hand and close to the knuckles. The tiny hand can therefore easily grasp a sphere of large enough size such that the fingers do not have to close on themselves or overlap.

According to this invention a baby spoon is provided with a conventional bowl and a short generally pear shaped handle having the large rounded end remote from the bowl and the smaller end at the bowl. Approximately a diameter of ¾ of an inch is a convenient size with the handle only slightly longer than twice the diameter at the large end of the handle. This shape enables the child to grasp the large end as it would a ball and from either the end for pushing the bowl through a dish of food or from the side for ease in lifting food, each manner of grasping being perormed without having to direct much of the muscles of the first or second joints.

Referring to the drawing.

Figure 1:
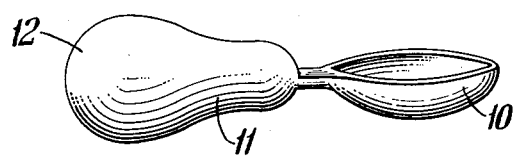
Fig. 1 is a perspective of a preferred embodiment of this invention.
Figure 2:
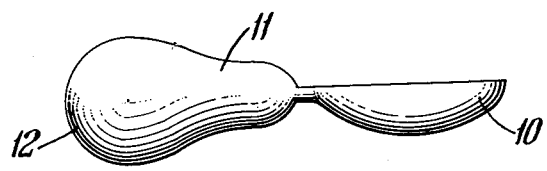
Fig. 2 is a side view of the spoon of Fig. 1.
Figure 3:
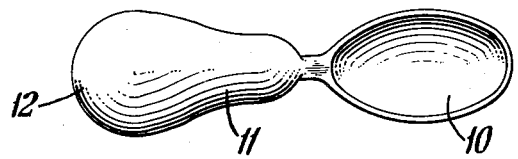
Fig. 3 is a top plan view of the spoon of Figs. 1 and 2.

The bowl 10 of the baby spoon shown in Fig. 1 is of any conventional size and shape for a small child's first efforts at feeding itself. The handle 11 is of general pear shape as illustrated with its small end substantially contiguous the bowl. A large generally hemispherical end 12 is of a diameter to fit the hand with facility from either a side or an end as in grasping a ball. A convenient size for this purpose has been mentioned above. From the enlarged end the handle is tapered gradually toward the adjacent end of the bowl.

The handle may be of any metal used in such spoons or it may be of wood or thermo-plastic material capable of being molded with the bowl as a unit. When the bowl and handle are of silver, or aluminum, or stainless steel, the handle should be hollow for lightness in weight and formed with the bowl by stamping from a sheet and folding under and soldering or welding the adjacent edges on the under side of the handle. A preferred length for the bowl is about 1½ or 1¾ inches and the handle is about 1¾ inches long, total length about 3¼ inches.

An ordinary teaspoon is unsuited to the needs of a young child because it entails conforming the first and second joints of the inexperienced fingers to handle contour. This same criticism applies to many so-called baby spoons on the mraket. The spoon illustrated is free of this objection and is the closest approach to an old need for a baby spoon adapted to the child's needs. This spoon has a handle which is attractive in shape having the natural symmetry of a product of nature. When made of plastic or of anodized aluminum the handle alone or the handle and bowl may give an additional aesthetic appearance by being colored in soft pastel shades.

I claim:

1. A baby spoon comprising a bowl, a handle having a generally hemispherical end of a diameter of approximately three quarters of an inch and said diameter being about ¼ the total length of the bowl and handle, the handle adjacent said generally hemispherical end being also rounded for at least a portion of its length whereby a tiny hand may grasp the handle end or side portion adjacent thereto with substantially equal facility as it would in grasping a ball, the length of the handle being roughly about two to two and one half times the diameter of said hemispherical end.

2. A baby spoon according to claim 1 comprising a generally pear shaped handle with the smaller end thereof being substantially contiguous to said bowl.

References Cited in the file of this patent

UNITED STATES PATENTS

| | | |
|---|---|---|
| D. 167,623 | Eve | Sept. 2, 1952 |
| 537,021 | Darling et al. | Apr. 9, 1895 |
| 1,133,052 | Miklos | Mar. 23, 1915 |
| 2,338,980 | Stratton | Jan. 11, 1944 |
| 2,660,785 | Shaler | Dec. 1, 1953 |